United States Patent
Peters

(10) Patent No.: US 12,276,240 B2
(45) Date of Patent: Apr. 15, 2025

(54) LEAK DETECTION MODULE ENTROPY METHOD FOR EVAPORATIVE EMISSIONS SYSTEM

(71) Applicant: STONERIDGE CONTROL DEVICES, INC., Novi, MI (US)

(72) Inventor: Mark William Peters, Wolverine Lake, MI (US)

(73) Assignee: STONERIDGE CONTROL DEVICES, INC., Novi, MI (US)

(*) Notice: Subject to any disclaimer, the term of this patent is extended or adjusted under 35 U.S.C. 154(b) by 0 days.

(21) Appl. No.: 18/023,523

(22) PCT Filed: Sep. 15, 2021

(86) PCT No.: PCT/US2021/050404
§ 371 (c)(1),
(2) Date: Feb. 27, 2023

(87) PCT Pub. No.: WO2022/060794
PCT Pub. Date: Mar. 24, 2022

(65) Prior Publication Data
US 2023/0313762 A1 Oct. 5, 2023

Related U.S. Application Data

(60) Provisional application No. 63/078,612, filed on Sep. 15, 2020.

(51) Int. Cl.
G01M 3/02 (2006.01)
F02M 25/08 (2006.01)

(52) U.S. Cl.
CPC .... *F02M 25/0818* (2013.01); *F02M 25/0836* (2013.01); *F02M 25/089* (2013.01); *G01M 3/025* (2013.01); *F02M 2025/0845* (2013.01)

(58) Field of Classification Search
CPC .......... F02M 25/0818; F02M 25/0836; F02M 25/089; F02M 2025/0845; G01M 3/025
See application file for complete search history.

(56) References Cited

U.S. PATENT DOCUMENTS

| | | |
|---|---|---|
| 5,606,121 A | 2/1997 | Blomquist et al. |
| 5,635,630 A | 6/1997 | Dawson et al. |
| 6,044,314 A | 3/2000 | Cook et al. |

(Continued)

FOREIGN PATENT DOCUMENTS

KR 970035642 A 7/1997

OTHER PUBLICATIONS

International Search Report and Written Opinion for International Application No. PCT/US2021/050404 mailed Dec. 22, 2021.

(Continued)

*Primary Examiner* — Gonzalo Laguarda
(74) *Attorney, Agent, or Firm* — Carlson, Gaskey & Olds, P.C.

(57) ABSTRACT

A method of detecting a leak in an evaporative emissions system includes sealing an evaporative emissions system, achieving a first target pressure in the evaporative emissions system, achieving a second target pressure in the evaporative emissions system after achieving the first target pressure, and monitoring a system pressure subsequent to the second target pressure achieving step to determine a leak condition of the evaporative emissions system.

22 Claims, 5 Drawing Sheets

(56) References Cited

U.S. PATENT DOCUMENTS

| | | | |
|---|---|---|---|
| 6,082,337 | A | 7/2000 | Fujimoto et al. |
| 6,321,727 | B1 | 11/2001 | Reddy et al. |
| 6,820,466 | B2 | 11/2004 | Streib |
| 7,448,257 | B2 | 11/2008 | Kimura |
| 9,669,705 | B2 | 6/2017 | Pearce et al. |
| 9,857,266 | B2 | 1/2018 | Tseng et al. |
| 2013/0253799 | A1 | 9/2013 | Peters et al. |

OTHER PUBLICATIONS

International Preliminary Report on Patentability for International Application No. PCT/US2021/050404 mailed Mar. 30, 2023.
Supplementary European Search Report for European Application No. 21870103.5 mailed Oct. 8, 2024.

LEAK DETECTION MODULE ENTROPY METHOD FOR EVAPORATIVE EMISSIONS SYSTEM

CROSS-REFERENCE TO RELATED APPLICATIONS

This application claims priority to U.S. Provisional Application No. 63/078,612 filed on Sep. 15, 2020, and is incorporated herein by reference.

TECHNICAL FIELD

This disclosure relates to a method of performing a leak test on an evaporative emissions system of a gasoline powered vehicle, and to a system used to perform the method.

BACKGROUND

Evaporative emissions systems have long been required for gasoline powered vehicles. The system must undergo a leak test during a vehicle start-up procedure to ensure that fuel vapors will not leak into the atmosphere. A pump is used either to create a vacuum or pressurize the system. An external filter is used to prevent contamination that could damage the pump or other components of the system during operation. Various valves may be closed during this test procedure to maintain system pressure, and the pressure is monitored to determine if there are any leaks.

When a leak is present in the evaporative system at high ambient temperatures (>35° C.), gasoline vapors (VOC) vented through the leak exceeds the design intent of a properly functioning evaporative system. Over the course of 24 hours, the gases released through a 1.0 mm leak from the vapor dome of the fuel tank can exceed evaporative leak regulations by more than 10 times the allowable amount. Therefore, it is desirable to provide an evaporative emissions system leak test that is able to quickly and accurately detect a leak in the system.

SUMMARY

In one exemplary embodiment, a method of detecting a leak in an evaporative emissions system includes sealing an evaporative emissions system, achieving a first target pressure in the evaporative emissions system, achieving a second target pressure in the evaporative emissions system after achieving the first target pressure, and monitoring a system pressure subsequent to the second target pressure achieving step to determine a leak condition of the evaporative emissions system.

In a further embodiment of any of the above, the first target pressure achieving step and the second target pressure achieving step are performed by pulling a vacuum on the evaporative emissions system.

In a further embodiment of any of the above, the first and second target pressures are the same as one another.

In a further embodiment of any of the above, the first and second target pressure achieving steps respectively correspond to a first and second entropy changes. The second entropy change is substantially less than the first entropy change.

In a further embodiment of any of the above, the second target pressure achieving step is performed based upon an ambient temperature.

In a further embodiment of any of the above, the leak condition includes at least one of a no leak condition, very small leak condition and small leak condition.

In a further embodiment of any of the above, an onboard diagnostic system generates an engine malfunction code in response to each of the very small leak condition and small leak condition.

In a further embodiment of any of the above, the sealed evaporative emissions system includes components comprising a fuel filler and cap, a purge valve, a fresh air side of a charcoal canister, a vapor dome of a fuel tank, and vapor lines the components. The vapor lines include a second fluid passageway. A pressure transducer is fluidly connected to the components and the vapor lines. The system pressure monitoring step includes measuring the system pressure with the pressure transducer.

In a further embodiment of any of the above, the evaporative emissions system sealing step includes closing a canister valve solenoid to close off a first fluid passageway to atmosphere.

In a further embodiment of any of the above, each of the first target pressure achieving step and the second target pressure achieving step include pumping fluid through a check valve.

In another exemplary embodiment, an evaporative emissions system includes a fuel tank with a fuel filler and a cap. The fuel tank is configured to contain fuel and fuel vapors. The system further includes a charcoal canister that is configured to store the fuel vapors from the fuel tank. The system further includes a purge valve that is in fluid communication with the charcoal canister and is configured to selectively provide the fuel vapors to an engine in response to a purge command. The system further includes a leak detection module that includes a canister valve solenoid, a pump, a check valve and a pressure transducer. A first fluid passageway fluidly connects the canister valve solenoid to atmosphere. A second fluid passageway fluidly connects the charcoal canister to the pump through the check valve. The pump fluid is arranged between the check valve and atmosphere. A controller is in communication with the canister valve solenoid and the pressure transducer. The controller is configured to run a leak test procedure that includes closing the canister valve solenoid to seal the evaporative emissions system, achieving a first target pressure with the pump, achieving a second target pressure with the pump after achieving the first target pressure, and monitoring a system pressure with the pressure transducer subsequent to achieving to determine a leak condition of the evaporative emissions system.

In a further embodiment of any of the above, the pump pulls a vacuum on the evaporative emissions system to achieve the first and second target pressures.

In a further embodiment of any of the above, the first and second target pressures are the same as one another.

In a further embodiment of any of the above, the first and second target pressures respectively correspond to a first and second entropy changes. The second entropy change is substantially less than the first entropy change.

In a further embodiment of any of the above, the second target pressure achieving step is performed based upon an ambient temperature.

In a further embodiment of any of the above, the leak condition includes at least one of a no leak condition, very small leak condition and small leak condition.

In a further embodiment of any of the above, an onboard diagnostic system generates an engine malfunction code in response to each of the very small leak condition and small leak condition.

In a further embodiment of any of the above, the sealed evaporative emissions system includes components that include the fuel filler and the cap, the purge valve, the fresh air side of the charcoal canister, a vapor dome of the fuel tank, and vapor lines the components. The vapor lines include the second fluid passageway. The pressure transducer fluidly connects to the components and the vapor lines.

In a further embodiment of any of the above, the closed canister valve solenoid closes off the first fluid passageway to atmosphere.

In a further embodiment of any of the above, each of the first and second target pressures are achieved by pumping fluid through the check valve.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
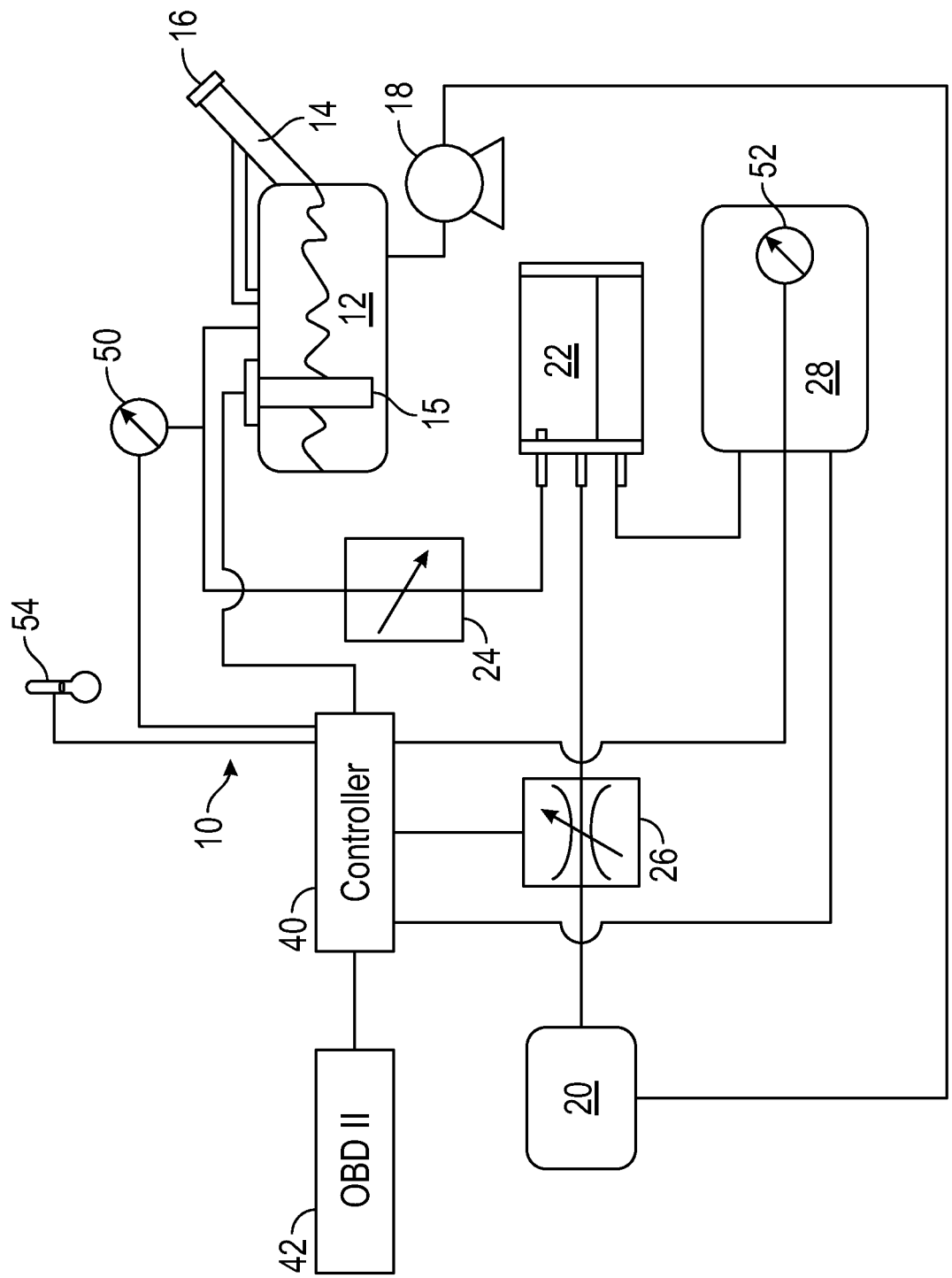
FIG. 1 schematically illustrates portions of one example evaporative fuel system.

FIG. 1 schematically illustrates a portion of an example evaporative fuel system 10. The system 10 includes a fuel tank 12 having a fuel filler 14 with a fill cap 16. A fuel pump 18 supplies gasoline, for example, from the fuel tank 12 to an internal combustion engine 20. A fuel level sensor 15 is in communication with a controller 40 and measures a level of fuel within the fuel tank 12, which also correlates to an amount of fuel vapor within the fuel tank 12.

The system 10 is configured to capture and regulate the flow of fuel vapors within the system. In one example, a fuel tank isolation valve 24 is arranged fluidly between the fuel tank 12 and a charcoal canister 22, which captures and stores fuel vapors for later use by the engine 20. A purge valve 26 is fluidly connected between the canister 22 and the engine 20. The controller 40 regulates a position of the purge valve 26 to selectively provide the fuel vapors to the engine 20 during operation to make use of these fuel vapors.

The integrity of the system 10 must be periodically tested to ensure no fuel vapors can leak from the system 10. One type of system 10 uses a leak detection module (LDM) 28, which can be used to pull a vacuum and/or pressurize the system to determine whether a leak exists, for example, using a pressure transducer 52. In one example leak test procedure, the purge valve 26 is closed and the controller 40 operates the leak detection module 28 to evacuate or pressurize the system. Another pressure transducer 50 may be used to monitor the pressure of fuel vapors within the fuel tank 12 during other conditions. An ambient temperature sensor 54, which is optional, is in communication with the controller 40. The temperature sensor 54 may be useful for quantify heat transfer characteristics of the fuel vapor within the fuel tank 12 relative to surrounding atmospheric temperature.

Figure 2:
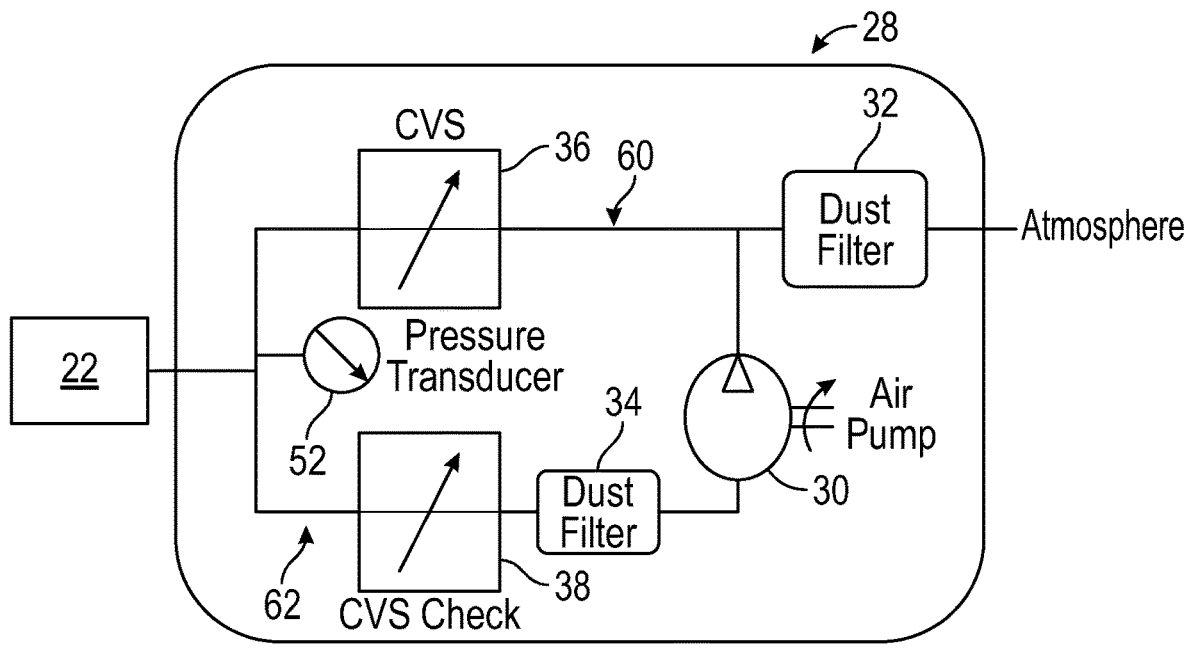
FIG. 2 is a schematic view of a leak detection module (LDM) for the system shown in FIG. 1.

The LDM 28 is schematically shown in FIG. 2. The LDM 28 includes a pump 30 arranged in a housing. One example pump is disclosed in Provisional Application Ser. No. 62/910,708 filed on Oct. 4, 2019, entitled "PUMP FOR EVAPORATIVE EMISSIONS SYSTEM", which is incorporated herein by referenced in its entirety. Some customers prefer a system that operates using a vacuum, while other customers prefer a system that is pressurized. So, to provide a pressurized evaporative emissions system test, the pump 30 will draw air from atmosphere through a filter 32 and direct the air towards the canister 22. Another filter 34 may be provided on the other side of the pump 30 to protect the pump from debris. To provide a depressurized or negative pressure evaporative emissions system test (i.e., vacuum), the pump 30 will draw air from the canister 22 and out to the atmosphere.

When the LDM 28 is not performing a leak check of the fuel system 10, a canister valve solenoid (CVS) 36 is in an open position to allow air to pass through a first fluid passageway 60 between the rest of the system 10 and atmosphere. This enables the system 10 to draw air from the atmosphere as needed.

When the LDM 28 is performing a leak test of the of the fuel system 10, the CVS 36 is in a closed position, which provides a second fluid passageway 62 on the side of the canister 22. A CVS check valve 38 is arranged in the second fluid passageway 62 and selectively blocks the canister 22 from the pump 30 and atmosphere. The pressure transducer 52 is arranged to read the pressure in the second fluid passageway 62 when the CVS 36 is closed, although the pressure transducer can be used for other purposes.

Figure 2A:
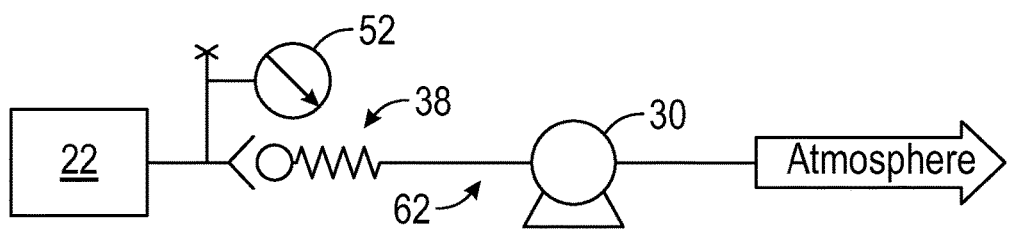
FIG. 2A is a schematic of the LDM configured to operate the system at a negative pressure (vacuum) during a leak test procedure.
Figure 2B:
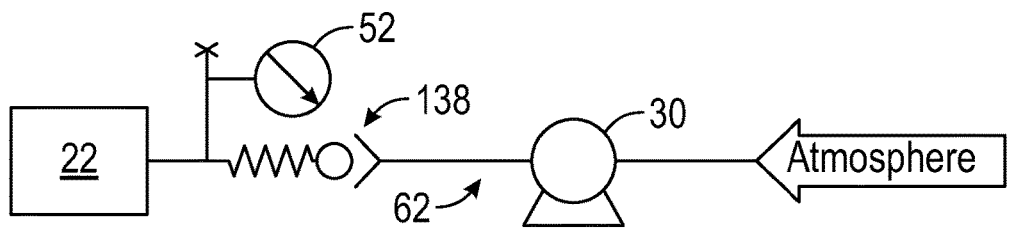
FIG. 2B is a schematic of the LDM configured to operate the system at a positive pressure (pressurized) during a leak test procedure.

The LDM 28 contains the hardware necessary to determine if the system 10 has a leak to atmosphere. During a leak test, depending upon how the CVS check valve that is used to decouple the pump 30 from the volume of air that is being check for leaks. The pump 30 can either create a negative pressure (vacuum) or a positive pressure in the evaporative emissions system depending upon its direction of rotation as described above. FIG. 2A schematically illustrates the CVS check valve 38 for a negative pressure leak test, and FIG. 2B schematically illustrates the CVS check valve 138 for a positive pressure leak test. The leak boundary of the system 10 includes the fuel filler 14 and cap 16, the purge valve 26, the fresh air side of the canister 22 (side connected to the LDM 28), the vapor dome of the fuel tank 12, and vapor lines connecting all components, including the second fluid passageway 62.

During the leak test, the pressure transducer 52 is in fluid communication with the second fluid passageway 62 and monitors the pressure condition generated by the pump 60 in the system 10. The pressure transducer 52 is in communication with the controller 40, which determines if there is a variation in pressure over a predetermined amount of time in the evaporative emissions system that might indicate a leak. Any change in pressure detected by the pressure transducer 52, which is monitored by the controller 40, is indicative of a leak. An OBDII diagnostics system 42 communicates with the controller 42 and uses the pressure information from the pressure transducer to generate engine malfunction codes that may be stored and for illuminating a "check engine" light on the vehicle instrument panel indicating vehicle service is needed.

The controller 40 and OBDII system 42 may be integrated or separate. In terms of hardware architecture, such a controller can include a processor, memory, and one or more input and/or output (I/O) device interface(s) that are communicatively coupled via a local interface. The local interface can include, for example but not limited to, one or more buses and/or other wired (e.g., CAN, LIN and/or LAN) or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The processor can be a custom made or commercially available processor, a central processing unit (CPU), an auxiliary processor among several processors associated with the controller, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the controller is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Figure 3A:
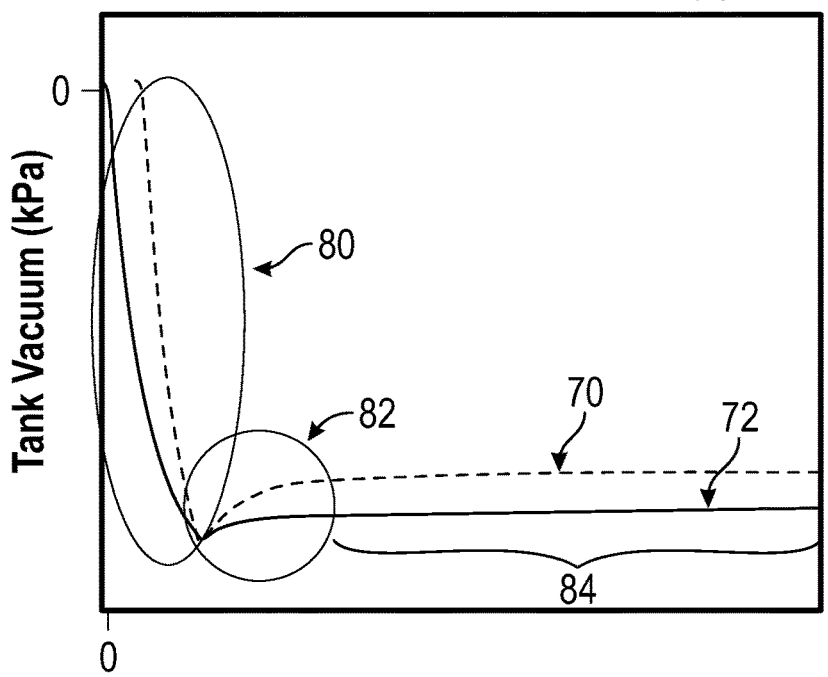
FIG. 3A is a graph illustrating the prior art entropy curves of an aluminum fuel tank and of fuel vapor in the fuel tank in kPa v. J.

Turning to FIG. 3A, the effects of entropy with the system 10 make quick and efficient leak detection more difficult. A typical leak test is performed by evacuating (shown; or pressurizing) the fuel tank 12 to a target pressure. The effects of entropy 80 on the fuel tank wall and the fuel vapor within the fuel tank 12 is respectively illustrated by the curves 70 and 72. The heat transfer 82 is also depicted.

Literature had suggested that for a given temperature, fuel vaporization in a vacuum condition, is linear and results with a linear change in pressure. However, testing has not provided linear results. This is due to the non-linear response in the change in entropy and heat transfer. After target vacuums are reached and the system is sealed, the pressure decays first at a non-linear rate and then becomes linear. The magnitude of the non-linear response is a function of ambient temperature. The slope of the linear response is a result of fuel vaporization. For fuel of the same volatility, vaporization increases with temperature. The non-linear response is common to both vacuum and pressure systems. System entropy changes as a function of pressure change. Evacuating a sealed tank results in a decrease in entropy (decrease in temperature), and pressurizing a sealed tank results in an increase in entropy (increase in temperature).

The rate of heat transfer is a function of fuel tank material and temperature differential. For a fuel tank in equilibrium, the temperature in the tank decreases as the vacuum (example shown) increases resulting in a temperature differential across the fuel tank wall to atmosphere. After the tank is sealed, heat flows through the tank shell back to the vapor space until the air space is again at equilibrium.

Figure 3B:
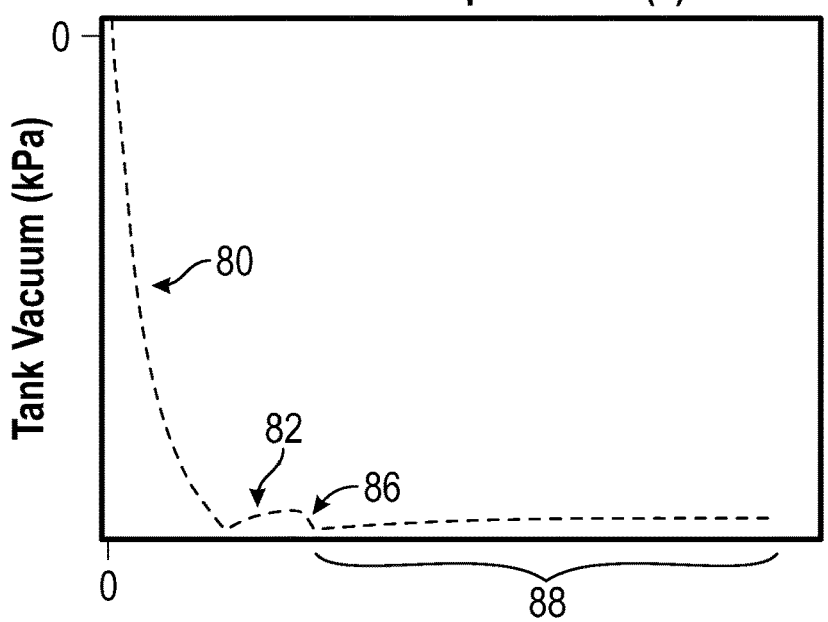
FIG. 3B is a graph of the fuel vapor in the fuel tank according to the disclosed method and system in kPa v. J.

Eliminating the change in entropy is impossible due to the laws of physics, but the impact of this undesired entropy change can be mitigated. The disclosed method (FIG. 5), the effects being graphically illustrated in FIG. 3B, mitigates the impact of entropy change by evacuating/pressurizing the system 10 to first target pressure (first curve 80), holding the system 10 sealed to allow heat exchange to occur (second curve 82), and again evacuating/pressurizing the system 10 to a second target pressure (third curve 86). The first and second target pressures respectively correspond to a first and second entropy changes. The second entropy change is substantially less than the first entropy change, for example, 10% or less of the first entropy change.

The ambient temperature measured by the temperature sensor 54 can be used to determine, for example, how quickly to evacuate/pressurize the system 10 a second time based upon the heat transfer rate. In one example, the first and second target pressures are the same, for example, within 5% of one another. The duration of the second evacuation (or pressurization) can be significantly shorter than initial draw down, or first evacuation (or pressurization) resulting with less entropy change and thus less need for heat transfer. In one example, evacuating the system 10 the first and second times take a total of 15-120 seconds to achieve the target pressure at which time the system pressure is then held to determine if there is a pressure loss indicative of a leak. It may take longer or shorter depending upon the vapor space volume. Following this process results with a response due to leaks in the system and not the heat exchange, resulting in a relatively constant pressure (curve 88, shown for a no leak condition). Of course, additional evacuations (or pressurizations) may be performed, but the benefits will be much less compared to the second evacuation (or pressurization).

It is possible that pressure variation subsequent to the second evacuation (or pressurization) increases with a decrease in fuel level due to the greater exposure to the fuel tank wall temperature (bleed up in kPa for a negative pressure test; bleed down for a positive pressure test). The fuel level is measured by fuel level sensor 15. This pressure change during the relatively constant pressure curve 88 is illustrated by the upward sloping distributions in FIG. 4.

Figure 4:
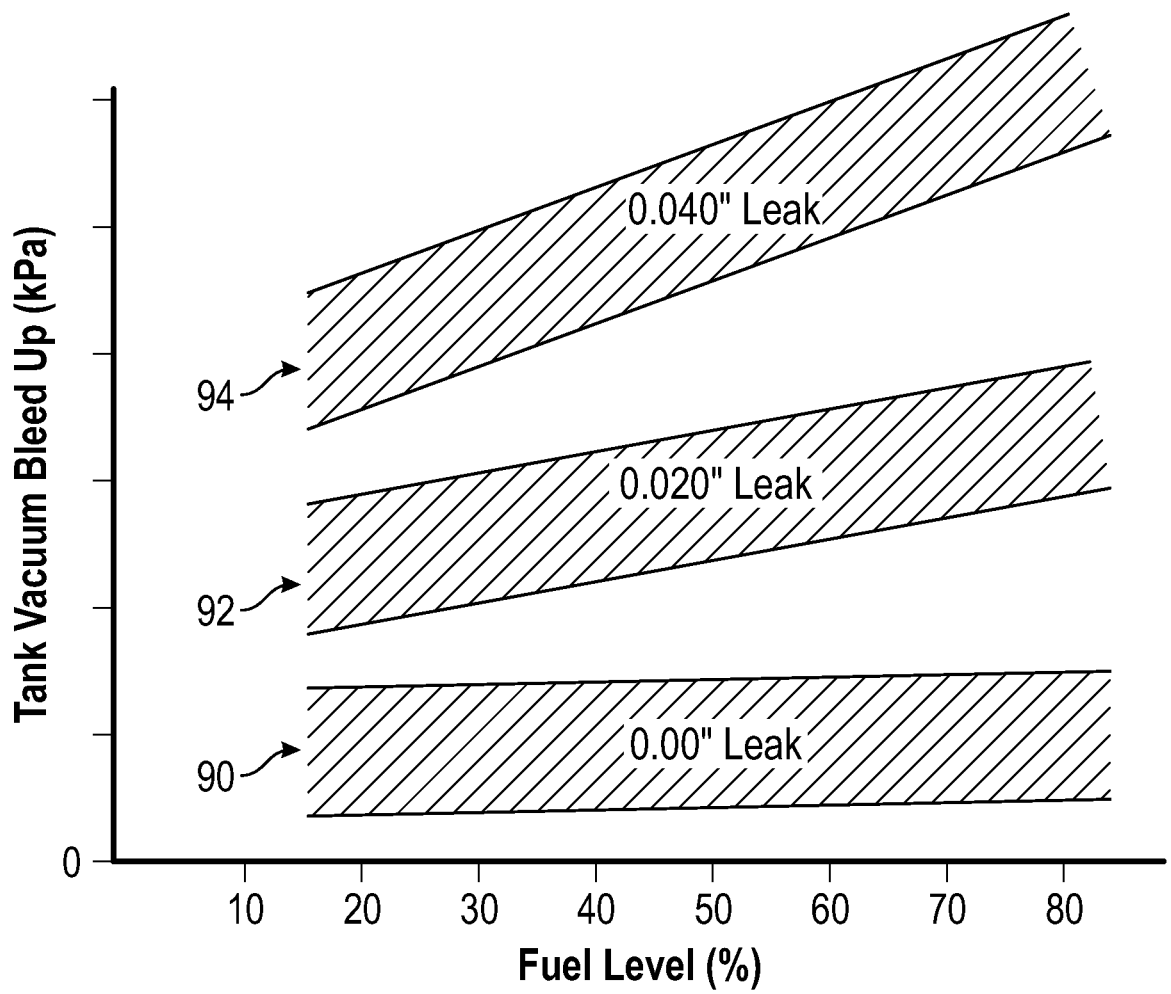
FIG. 4 is a graph of several leak rates (no leak (0.00" Ø), very small leak (0.020" Ø), small leak (0.040" Ø) for fuel tank vacuum v. fuel level.

The FIG. 4 graph illustrates several leak rates during the hold period (curve 88) during the test for the fuel level in the fuel tank 12. A system leak can be a summation of multiple small leaks. A "no leak" condition (0.00 inch Ø leak in the system 10) is shown by pressure distribution 90, which is sensed by the pressure transducer 52. It should be understood that even a "no leak" condition may not be airtight after a minute or so. A very small leak condition (equivalent to about a 0.020 inch Ø leak in the system 10 up to about a 0.040 inch Ø leak) is shown by the pressure distribution 92, which may be interpreted by the OBDII diagnostic system 42 as a "very small leak" corresponding to an engine malfunction code of P0456, for example. A small leak condition (equivalent to about a 0.040 inch Ø leak or greater in the system 10) is shown by the pressure distribution 94, which may be interpreted by the OBDII diagnostic system 42 as a "small leak" corresponding to an engine malfunction code of P0442, for example. The bleed up concept may not apply to a gross leak due to the inability to actually evacuate a system to target vacuum with a predetermined time, and this gross leak condition would may also result in an OBDII code.

Figure 5:
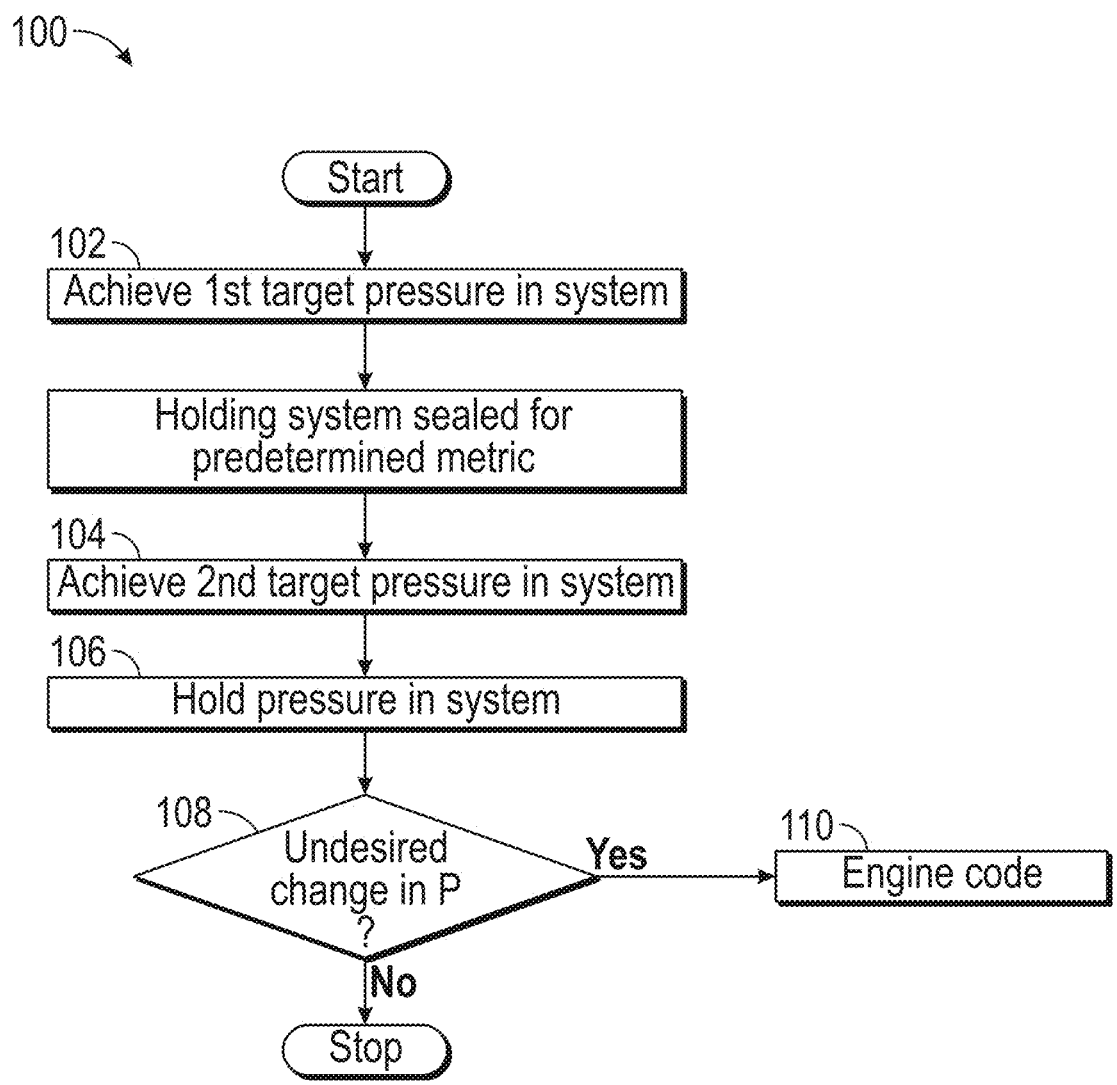
FIG. 5 is flow chart depicting an example leak detection method that minimizes the effects of entropy in the fuel tank.

In operation, a method 100 of detecting a leak in the evaporative emissions system 10 is shown in FIG. 5. The system 10 is sealed, and a first target pressure in the system is achieved (block 102), for example, by pulling a vacuum on the system. After a predetermined time or other metric including rate of change in signal, e.g., a pressure decay rate, a second target pressure in the system is achieved, again by pulling a vacuum one or more times. (block 104). The system pressure is held (block 106) and monitored (block 108) to determine a leak condition of the evaporative emissions system. Since additional evacuations (or pressurizations) may be performed, the second target pressure may correspond to a pressure after one or more vacuums are pulled on the system. The leak condition includes at least one of a no leak condition, very small leak condition and small leak condition. If there is an undesired change in pressure (e.g., over a time interval or a pressure decay rate) during the system pressure hold, then there is a leak in the system 10, and an onboard diagnostic system will generate an engine malfunction code (block 110) in response to each of the very small leak condition and small leak condition.

This method mitigates the undesired effects of entropy in the system, which would otherwise a much longer hold time before pressure monitoring could occur. It may be desirable to monitor the pressure decay rate rather than the pressure over time, since monitoring a pressure over time is dependent upon the volume of the vapor dome, which may require an undesirably long time interval for large gas tanks.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples. For example, the disclosed pump may be used in applications other than vehicle evaporative systems.

Although an example embodiment has been disclosed, a worker of ordinary skill in this art would recognize that certain modifications would come within the scope of the claims. For that reason, the following claims should be studied to determine their true scope and content.

What is claimed is:

1. A method of detecting a leak in an evaporative emissions system, comprising:
    sealing an evaporative emissions system;
    activating a pump a first time to achieve a first target pressure in the evaporative emissions system;
    holding the system sealed after achieving the first target pressure for a predetermined metric that allows a desired heat exchange to occur in the system, the holding occurring before again activating the pump a second time to achieve a second target pressure in the evaporative emissions system; and
    monitoring a system pressure subsequent to the second target pressure achieving step to determine a leak condition of the evaporative emissions system.

2. The method of claim 1, wherein the first target pressure achieving step and the second target pressure achieving step are performed by pulling a vacuum on the evaporative emissions system.

3. The method of claim 1, wherein the first and second target pressures are the same as one another.

4. The method of claim 1, wherein the first and second target pressure achieving steps respectively correspond to a first and second entropy changes, and the second entropy change substantially less than the first entropy change.

5. The method of claim 4, wherein the second target pressure achieving step is performed based upon an ambient temperature.

6. The method of claim 1, wherein the leak condition includes at least one of a no leak condition, very small leak condition and small leak condition.

7. The method of claim 6, wherein an onboard diagnostic system generates an engine malfunction code in response to each of the very small leak condition and small leak condition.

8. The method of claim 1, wherein the sealed evaporative emissions system includes components comprising a fuel filler and cap, a purge valve, a fresh air side of a charcoal canister, a vapor dome of a fuel tank, and vapor lines the components, the vapor lines include a second fluid passageway, and a pressure transducer fluidly connected to the components and the vapor lines, the system pressure monitoring step includes measuring the system pressure with the pressure transducer.

9. The method of claim 8, wherein the evaporative emissions system sealing step includes closing a canister valve solenoid to close off a first fluid passageway to atmosphere.

10. The method of claim 9, wherein each of the first target pressure achieving step and the second target pressure achieving step include pumping fluid through a check valve.

11. The method of claim 1, wherein the predetermined metric is a predetermined time.

12. An evaporative emissions system comprising:
    a fuel tank with a fuel filler and a cap, the fuel tank configured to contain fuel and fuel vapors;
    a charcoal canister configured to store the fuel vapors from the fuel tank;

a purge valve in fluid communication with the charcoal canister and configured to selectively provide the fuel vapors to an engine in response to a purge command;

a leak detection module including a canister valve solenoid, a pump, a check valve and a pressure transducer, a first fluid passageway fluidly connecting the canister valve solenoid to atmosphere, a second fluid passageway fluidly connecting the charcoal canister to the pump through the check valve, the pump fluid arranged between the check valve and atmosphere, a controller in communication with the canister valve solenoid and the pressure transducer, the controller configured to run a leak test procedure comprising:

closing the canister valve solenoid to seal the evaporative emissions system;

activating them pump a first time to achieve a first target pressure in the evaporative emissions system;

holding the system sealed after achieving the first target pressure for a predetermined metric that allows a desired heat exchange to occur in the system, the holding occurring before again activating the pump a second time to achieve a second target pressure in the evaporative emissions system; and monitoring a system pressure with the pressure transducer subsequent to achieving to determine a leak condition of the evaporative emissions system.

13. The system of claim 12, wherein the pump pulls a vacuum on the evaporative emissions system to achieve the first and second target pressures.

14. The system of claim 13, wherein the first and second target pressures are the same as one another.

15. The system of claim 12, wherein the first and second target pressures respectively correspond to a first and second entropy changes, and the second entropy change substantially less than the first entropy change.

16. The system of claim 15, wherein the second target pressure achieving step is performed based upon an ambient temperature.

17. The system of claim 12, wherein the leak condition includes at least one of a no leak condition, very small leak condition and small leak condition.

18. The system of claim 17, wherein an onboard diagnostic system generates an engine malfunction code in response to each of the very small leak condition and small leak condition.

19. The system of claim 12, wherein the sealed evaporative emissions system includes components comprising the fuel filler and the cap, the purge valve, the fresh air side of the charcoal canister, a vapor dome of the fuel tank, and vapor lines the components, the vapor lines include the second fluid passageway, and the pressure transducer fluidly connected to the components and the vapor lines.

20. The system of claim 19, wherein the closed canister valve solenoid closes off the first fluid passageway to atmosphere.

21. The system of claim 20, wherein each of the first and second target pressures are achieved by pumping fluid through the check valve.

22. The system of claim 12, wherein the predetermined metric is a predetermined time.

* * * * *